(12) United States Patent
Sohacki et al.

(10) Patent No.: US 11,780,542 B2
(45) Date of Patent: Oct. 10, 2023

(54) GYROSCOPIC ROLL STABILIZER WITH FLYWHEEL SHAFT THROUGH PASSAGE

(71) Applicant: WaveTamer LLC, Greenville, NC (US)

(72) Inventors: Brian John Sohacki, Livonia, MI (US); Andrew Siefert, Ypsilanti, MI (US)

(73) Assignee: WAVETAMER LLC, Greenville, NC (US)

( * ) Notice: Subject to any disclaimer, the term of this patent is extended or adjusted under 35 U.S.C. 154(b) by 0 days.

(21) Appl. No.: 18/020,406

(22) PCT Filed: Sep. 28, 2021

(86) PCT No.: PCT/US2021/052408
§ 371 (c)(1),
(2) Date: Feb. 8, 2023

(87) PCT Pub. No.: WO2022/072350
PCT Pub. Date: Apr. 7, 2022

(65) Prior Publication Data
US 2023/0227131 A1    Jul. 20, 2023

Related U.S. Application Data (60) Provisional application No. 63/085,324, filed on Sep. 30, 2020.

(51) Int. Cl.
*B63B 39/04* (2006.01)
*F16C 37/00* (2006.01)
(Continued)

(52) U.S. Cl.
CPC ............ *B63B 39/04* (2013.01); *F16C 37/007* (2013.01); *H02K 5/203* (2021.01); *H02K 7/02* (2013.01); *H02K 9/19* (2013.01); *F16C 2361/55* (2013.01)

(58) Field of Classification Search
CPC ....... B63B 39/00; B63B 39/04; F16C 37/007; F16C 2361/55; H02K 5/203; H02K 7/02; H02K 9/19
(Continued)

(56) References Cited

U.S. PATENT DOCUMENTS

| 1,655,800 A | 1/1928 | Schein |
| 2,795,142 A | 6/1957 | Smith |

(Continued)

FOREIGN PATENT DOCUMENTS

| BR | PI07071299 B1 | 7/2018 |
| CN | 1484739 A | 3/2004 |

(Continued)

OTHER PUBLICATIONS

Parker, Rotating Anode X-Ray Tube, United States Statutory Invention Registration, Reg. No. H312, Published Jul. 7, 1987.

*Primary Examiner* — Daniel V Venne
(74) *Attorney, Agent, or Firm* — COATS & BENNETT, PLLC (57) ABSTRACT

A gyroscopic roll stabilizer includes an enclosure, a flywheel assembly, and a motor. The enclosure is mounted to a gimbal for rotation about a gimbal axis and configured to maintain a below-ambient pressure. The flywheel assembly is rotatably mounted inside the enclosure for rotation about a flywheel axis. The flywheel assembly includes a flywheel and flywheel shaft. The flywheel shaft has a first end and an opposite second end; a first cavity formed in the first end and facing away from the second end; and a second cavity formed in the second end and facing away from the first end. The flywheel shaft has a longitudinal passage connecting the first cavity and the second cavity. This longitudinal passage may be used for inspection of one of the cavities and/or an (Continued)

associated seal, from the direction of the other cavity. Related methods are also disclosed.

20 Claims, 8 Drawing Sheets

(51) Int. Cl.
  *H02K 7/02* (2006.01)
  *H02K 9/19* (2006.01)
  *H02K 5/20* (2006.01)
(58) Field of Classification Search
  USPC .......................................................... 114/122
  See application file for complete search history.

(56) References Cited

U.S. PATENT DOCUMENTS

| | | | |
|---|---|---|---|
| 3,051,533 | A | 8/1962 | Brass |
| 3,260,872 | A | 7/1966 | Potter |
| 3,844,341 | A | 10/1974 | Bimshas, Jr. et al. |
| 4,165,472 | A | 8/1979 | Wittry |
| 4,304,296 | A | 12/1981 | Shaffer |
| 4,602,874 | A | 7/1986 | Neugebauer |
| 5,054,583 | A | 10/1991 | Wrzyszczynski |
| 6,144,128 | A | 11/2000 | Rosen |
| 6,373,394 | B1 | 4/2002 | Zhang |
| 6,566,775 | B1 | 5/2003 | Fradella |
| 6,913,390 | B2 | 7/2005 | Inoue et al. |
| 6,959,756 | B2 | 11/2005 | Woodard et al. |
| 6,973,847 | B2 | 12/2005 | Adams et al. |
| 7,546,782 | B2 | 6/2009 | Adams et al. |
| 8,117,930 | B2 | 2/2012 | Adams et al. |
| 8,899,166 | B2 * | 12/2014 | Steinmann ........... G05D 1/0875 114/122 |
| 10,794,699 | B2 | 10/2020 | Miocevich et al. |
| 10,989,534 | B2 | 4/2021 | Miocevich |
| 11,427,289 | B2 | 8/2022 | Smith et al. |
| 11,428,530 | B2 | 8/2022 | Salutari |
| 11,440,629 | B2 | 9/2022 | Peterson |
| 2003/0100376 | A1 | 5/2003 | Friedmann et al. |
| 2003/0184176 | A1 | 10/2003 | Steinmeyer |
| 2003/0221626 | A1 | 12/2003 | Leavitt et al. |
| 2004/0080218 | A1 | 4/2004 | Weidman et al. |
| 2004/0164495 | A1 | 8/2004 | Oldenburg |
| 2004/0244513 | A1 | 12/2004 | Adams et al. |
| 2005/0040776 | A1 | 2/2005 | Sibley |
| 2007/0157749 | A1 | 7/2007 | Adams et al. |
| 2008/0303363 | A1 | 12/2008 | Alston |
| 2009/0301373 | A1 | 12/2009 | Adams et al. |
| 2010/0109341 | A1 | 5/2010 | Fullerton |
| 2010/0320333 | A1 | 12/2010 | Martin |
| 2011/0209568 | A1 | 9/2011 | Anderson |
| 2013/0036959 | A1 | 2/2013 | Steinmann |
| 2014/0245939 | A1 | 9/2014 | Nohara |
| 2017/0009845 | A1 | 1/2017 | Arseneaux et al. |
| 2018/0034344 | A1 | 2/2018 | Hitchcock et al. |
| 2018/0051988 | A1 | 2/2018 | Miocevich et al. |
| 2018/0269743 | A1 | 9/2018 | Buttner et al. |
| 2019/0367137 | A1 | 12/2019 | Smith et al. |
| 2019/0367138 | A1 | 12/2019 | Smith |
| 2020/0317308 | A1 | 10/2020 | Peterson |
| 2020/0400432 | A1 | 12/2020 | Miocevich et al. |
| 2021/0171165 | A1 | 6/2021 | Skauen |
| 2021/0231437 | A1 | 7/2021 | Salutari |
| 2021/0269127 | A1 | 9/2021 | Sohacki |

FOREIGN PATENT DOCUMENTS

| | | |
|---|---|---|
| CN | 101443987 A | 5/2009 |
| CN | 102810943 A | 12/2012 |
| CN | 104578595 A | 4/2015 |
| CN | 204408103 U | 6/2015 |
| CN | 105292395 B | 2/2016 |
| CN | 107757838 A | 3/2018 |
| CN | 207064483 U | 3/2018 |
| CN | 110131319 A | 8/2019 |
| DE | 19909491 A1 | 7/2000 |
| EP | 0458499 B1 | 7/1997 |
| EP | 2361833 A2 | 8/2011 |
| EP | 3339804 A1 | 6/2018 |
| FR | 1432057 A | 3/1966 |
| JP | H09144806 A | 6/1997 |
| JP | H09506310 A | 6/1997 |
| JP | H09263293 A | 10/1997 |
| JP | 2005503097 A | 1/2005 |
| JP | 201828542 A | 2/2018 |
| WO | 9513647 A1 | 5/1995 |
| WO | 0202943 A1 | 1/2002 |
| WO | 03023942 A1 | 3/2003 |
| WO | 2014019322 A1 | 2/2014 |
| WO | 2016050534 A1 | 4/2016 |
| WO | 2019224322 A1 | 11/2019 |
| WO | 2019232371 A1 | 12/2019 |
| WO | 2022046508 A1 | 3/2022 |

\* cited by examiner

GYROSCOPIC ROLL STABILIZER WITH FLYWHEEL SHAFT THROUGH PASSAGE

RELATED APPLICATIONS

This application claims benefit of U.S. Provisional Application No. 63/085,324, which was filed Sep. 30, 2020, the disclosure of which is incorporated herein by reference in its entirety.

TECHNICAL FIELD

The present disclosure relates generally to boat roll stabilizers for reducing the sideways rolling motion of a boat and, more particularly, to controlled moment gyroscopes for reducing the roll of a boat based on the gyroscopic effect.

BACKGROUND

The sideways rolling motion of a boat can create safety problems for passengers and crew on boats, as well as cause discomfort to passengers not accustomed to the rolling motion of the boat. A number of technologies currently exist to reduce the sideways rolling motion of a boat. One technology currently in use is gyroscopic boat stabilization for roll suppression, which is based on the gyroscopic effect. A control moment gyroscope (CMG) is mounted in the boat and generates a torque that can be used to counteract the rolling motion of the boat. The CMG includes a flywheel that spins at a high speed. A controller senses the attitude of the boat and uses the energy stored in the flywheel to "correct" the attitude of the boat by applying a torque to the hull counteracting the rolling motion of the boat.

Although, CMGs are gaining in popularity, particularly for smaller fishing boats and yachts, such devices are somewhat complicated to assemble correctly. For example, CMGs that utilize some forms of bearing cooling for the bearings supporting the flywheel that include having a low vapor pressure fluid disposed in or around end portions of the flywheel shaft, such as in cavities formed in the end portions of the flywheel shaft. Filling these cavities with the low vapor pressure fluid, and sealing that fluid in the cavities as appropriate, may be challenging both during initial assembly, and during any rework/repair operations.

Thus, there is a need for approaches to configuring control moment gyroscopes to allow for efficient assembly and/or repair, particularly in relation to filling and/or inspecting the cavities and/or sealing arrangements for bearing cooling systems.

SUMMARY

The present disclosure relates to a gyroscopic roll stabilizer for a boat, and related methods. In an aspect, the gyroscopic roll stabilizer includes a flywheel assembly rotatably mounted inside an enclosure for rotation about a flywheel axis. The flywheel assembly includes a flywheel and flywheel shaft; the flywheel shaft has a longitudinal through passage that connects first and second open-ended cavities at opposing ends of the flywheel shaft. This longitudinal passage may be used for inspection of one of the cavities and/or an associated seal, from the direction of the other cavity.

In one or more aspects, the gyroscopic roll stabilizer includes an enclosure, a flywheel assembly, and a motor. The enclosure is mounted to a gimbal for rotation about a gimbal axis and configured to maintain a below-ambient pressure. The flywheel assembly is rotatably mounted inside the enclosure for rotation about a flywheel axis. The flywheel assembly includes a flywheel and flywheel shaft. The flywheel shaft has a first end and an opposite second end; a first open-ended cavity formed in the first end and facing away from the second end; and a second open-ended cavity formed in the second end and facing away from the first end. The motor is operative to rotate the flywheel assembly. The flywheel shaft has a longitudinal passage connecting the first cavity and the second cavity. A liquid heat transfer medium is optionally disposed in the first cavity, the second cavity, and the longitudinal passage. In some aspects, the gyroscopic roll stabilizer is such that:

the gyroscopic roll stabilizer further comprises a first heat transfer shaft assembly rotationally fixed relative to the flywheel axis and extending from the enclosure into the first cavity so as to contact the liquid heat transfer medium; and/or the gyroscopic roll stabilizer further comprises a second heat transfer shaft assembly rotationally fixed relative to the flywheel axis and extending from the enclosure into the second cavity so as to contact the liquid heat transfer medium; and/or the first end is disposed above the second end; and/or the heat transfer medium fills the second cavity and the longitudinal passage, and the heat transfer medium does not fill the first cavity at room temperature; and/or there is only one longitudinal passage through the flywheel shaft from the first cavity to the second cavity; and/or the flywheel and the flywheel shaft are integrally formed with one another.

Other aspects of the disclosure relates to methods of assembling or maintaining a gyroscopic roll stabilizer for a boat. The gyroscopic roll stabilizer includes an enclosure and a flywheel assembly supported in the enclosure for rotation about a flywheel axis. The flywheel assembly includes a flywheel shaft and a flywheel. The method includes accessing a first open-ended cavity in a first end of the flywheel shaft; and inspecting a second open-ended cavity in a second end of the flywheel shaft and/or a seal associated with the second cavity via a longitudinal passage in the flywheel shaft that extends between the first cavity and the second cavity; wherein the longitudinal passage is accessed via the first cavity for the inspecting. The inspecting may comprise executing a pressure test and/or using an inspection tool inserted into the longitudinal passage. The method optionally includes thereafter filling the second cavity with a liquid heat transfer medium via the longitudinal passage. The first cavity may be above the second cavity during the inspecting, or the positions/roles may be reversed. In some aspects, the method is such that:

the inspecting comprises inspecting the seal associated with the second cavity; and/or the inspecting comprises executing a pressure test; and/or the method further comprises: inserting an inspection tool into the longitudinal passage toward the second end; and removing the inspection tool; and/or wherein the inspection tool is a bore scope; and/or the method further comprises, prior to the inserting, removing, from the first cavity, a first heat transfer shaft assembly rotationally fixed relative to the flywheel axis and extending from the enclosure; and/or the method comprises thereafter filling the second cavity with a liquid heat transfer medium via the longitudinal passage; and/or the method further comprises filling the longitudinal passage, and at least part of the first cavity, with the liquid heat transfer medium; and/or the method further comprises, after the filling, inserting a first heat transfer shaft assembly rotationally fixed relative to the flywheel axis and extending from the enclosure into the first cavity; and/or the method further comprises adjusting or replacing the seal based on the inspecting; and/or the method further comprises thereafter spinning the flywheel.

In other aspects, the disclosure relates to a method of assembling a gyroscopic roll stabilizer for a boat. The gyroscopic roll stabilizer includes an enclosure and a flywheel assembly supported in the enclosure for rotation about a flywheel axis. The flywheel assembly includes a flywheel shaft and a flywheel. The method includes installing a second seal associated with a second open-ended cavity in a second end of the flywheel shaft; accessing a first open-ended cavity in an opposing first end of the flywheel shaft; inspecting, with the second seal installed, the second open-ended cavity and/or the second seal via a longitudinal passage in the flywheel shaft that extends between the second cavity and the first cavity; filling the second cavity with a liquid heat transfer medium via the longitudinal passage by adding the liquid heat transfer medium to the longitudinal passage and/or the first cavity; after the filling, closing the enclosure; wherein the longitudinal passage is accessed via the first cavity for the inspecting. The first cavity may be above the second cavity during the inspecting, or the positions/roles may be reversed. In some aspects, the method is such that:

the inspecting comprises inspecting the second seal; and/or the inspecting comprises executing a pressure test; and/or the method further comprises inserting an inspection tool into the longitudinal passage toward the second end; and removing the inspection tool; and/or the inspection tool is a bore scope; and/or the filing comprises filling the longitudinal passage, and at least part of the first cavity, with the liquid heat transfer medium; and/or the method further comprises, after the filling and before the closing, inserting a first heat transfer shaft assembly rotationally fixed relative to the flywheel axis and extending from the enclosure into the first cavity; and/or the method further comprises adjusting or replacing the second seal based on the inspecting; and/or the method further comprises thereafter spinning the flywheel.

The features, functions and advantages that have been discussed above, and/or are discussed below, can be achieved independently in various aspects or may be combined in yet other aspects, further details of which can be seen with reference to the following description and the drawings.

DETAILED DESCRIPTION

Figure 1A:
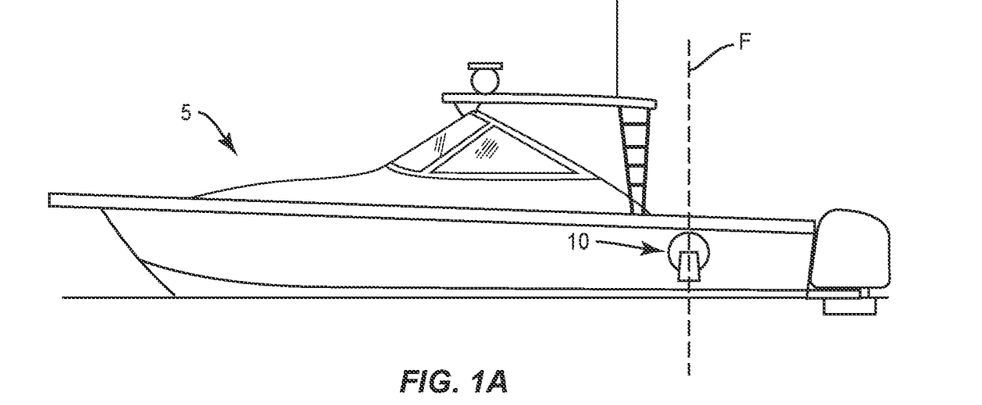
FIGS. 1A and 1B illustrate a boat equipped with a CMG as herein described.
Figure 1B:
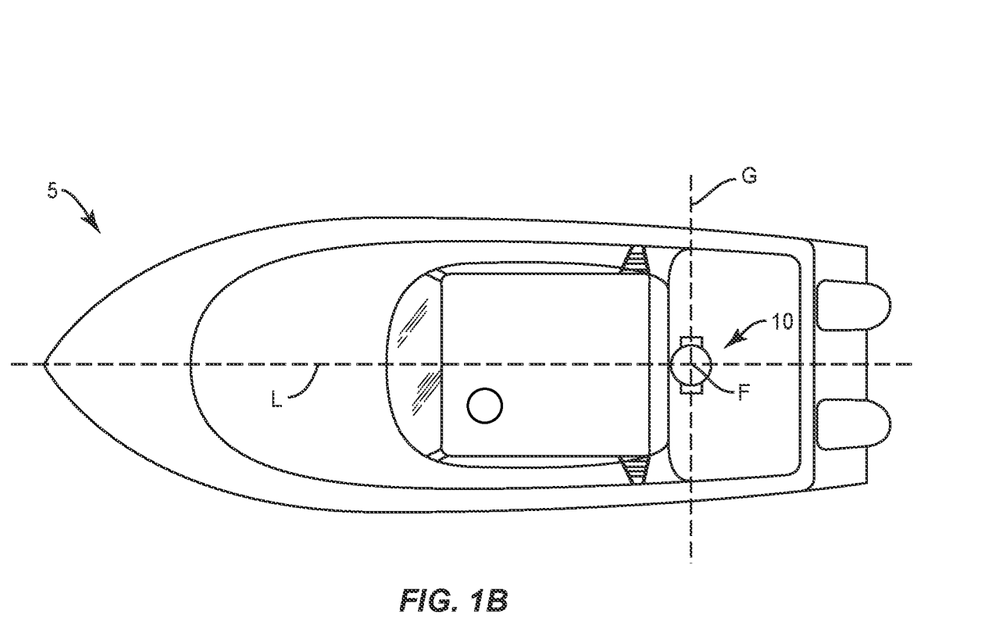

Referring now to the drawings, FIGS. 1A and 1B illustrate a control moment gyroscope (CMG) 10 mounted in a boat 5 for roll stabilization. Multiple embodiments of the CMG 10 are described. For convenience, similar reference numbers are used in the following description of the embodiments to indicate similar elements in each of the embodiments.

Figure 2:
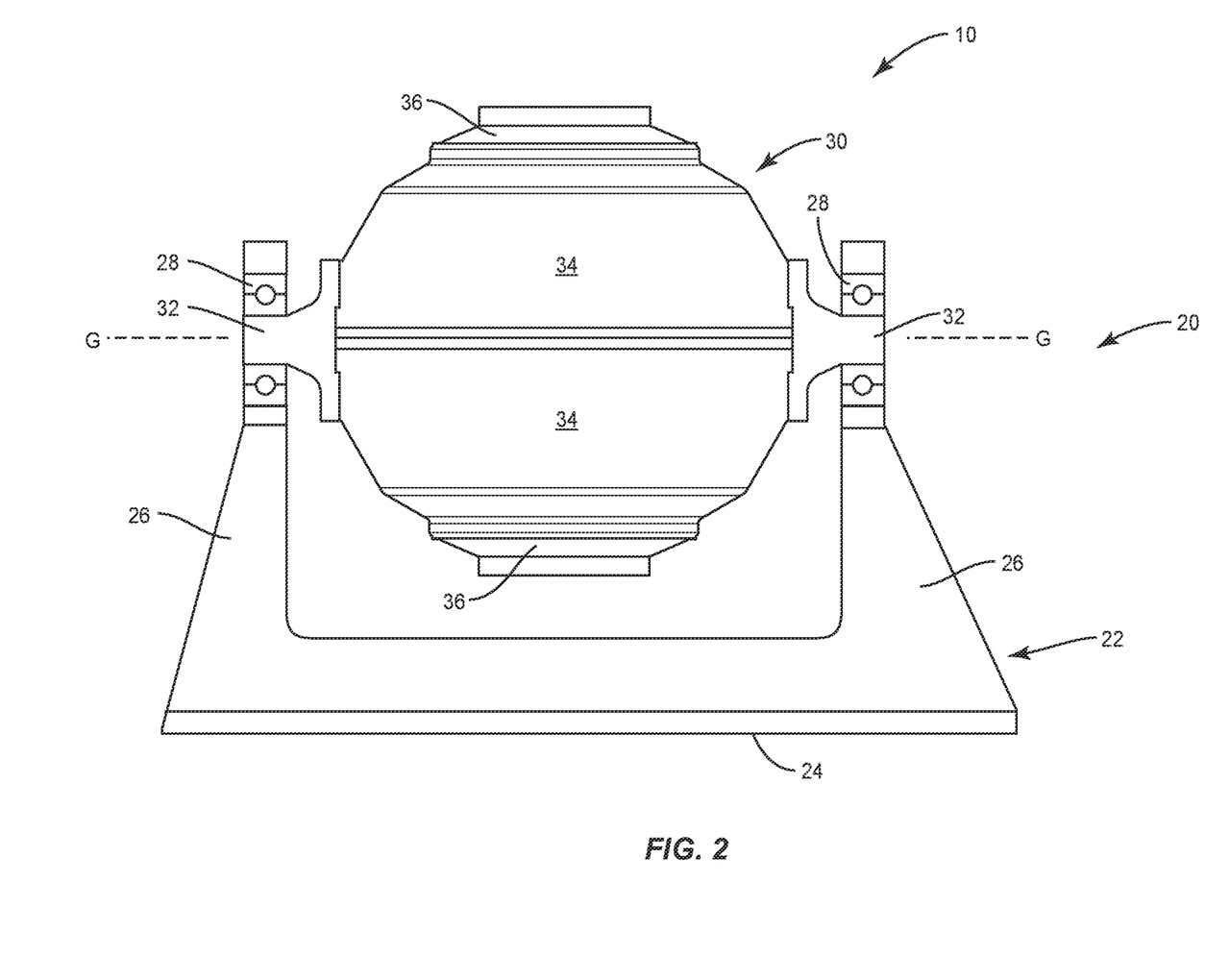
FIG. 2 show an elevation view of a CMG configured as a boat roll stabilizer according to an embodiment.
Figure 3:
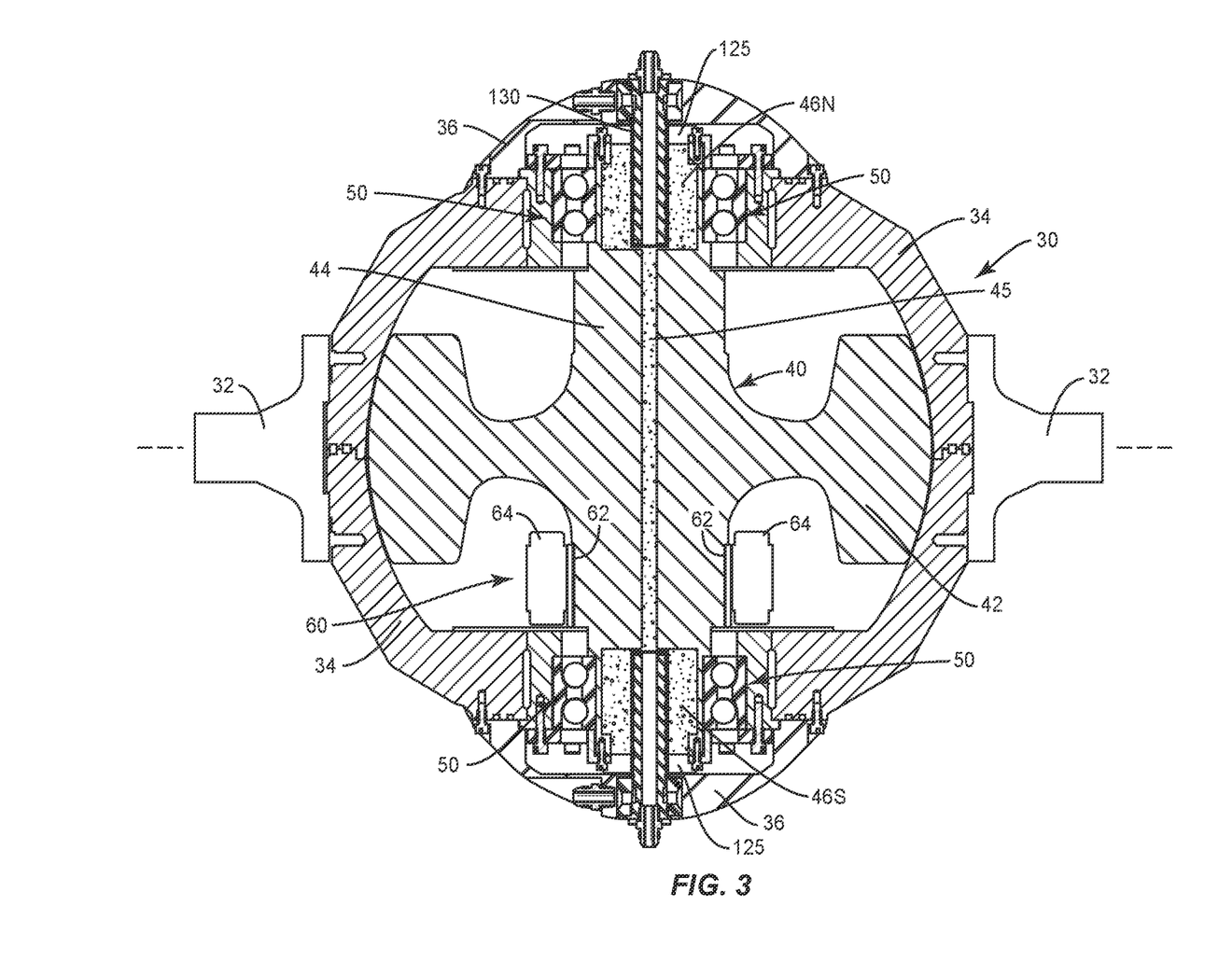
FIG. 3 shows a section view through the enclosure of a CMG according to an embodiment.

Referring now to FIGS. 2 and 3, the main functional elements of the CMG 10 comprise a single-axis gimbal 20, an enclosure 30 mounted to the gimbal 20 for rotation about a gimbal axis G, a flywheel assembly 40 mounted by bearings 50 inside the enclosure, a motor 60 to rotate the flywheel assembly 40, and a torque control system 70 (FIG. 4) to control precession of the flywheel assembly 40 so that the energy of the flywheel assembly 40 is transferred to the hull of the boat 5 to counteract rolling motions. Each of the embodiments further comprises a bearing cooling system 100 to cool the flywheel bearings 50. Various designs of the bearing cooling system 100 are shown in the figures.

The gimbal 20 comprises a support frame 22 that is configured to be securely mounted in the boat 5. Preferably, the gimbal 20 is mounted along a longitudinal axis L of the boat 5 with the gimbal axis G extending transverse to the longitudinal axis L. Conventionally, the gimbal 20 is mounted in the hull of the boat 5, but could be mounted at any location. The support frame 22 of the gimbal 20 comprises a base 24 and two spaced-apart supports 26. A bearing 28 is mounted on each support 26 for rotatably mounting the enclosure 30 to the supports 26. For this purpose, the enclosure 30 includes two gimbal shafts 32 projecting from diametrically opposed sides of the enclosure 30. The gimbal shafts 32 are rotatably journaled in the gimbal bearings 28 to allow the enclosure 30 and flywheel assembly 40 to rotate or precess about the gimbal axis G in the fore and aft directions.

The basic elements of enclosure 30 are the same in the various embodiments described herein but vary in some details depending on the design of the bearing cooling system 100. The enclosure 30 is generally spherical in form and comprises two main housing sections 34 and two cover plates 36. The two main housing sections 34 join along a plane that typically bisects the spherical enclosure 30. The cover plates 36 join the main housing sections 34 along respective planes closer to the "poles" of the spherical enclosure 30. All joints in the enclosure 30 are sealed to maintain a below-ambient pressure within the enclosure 30 to reduce aerodynamic drag on the flywheel assembly 40. Typical below-ambient pressures should be in the range of 1-40 torr (133-5333 Pa, 0.02-0.77 psi). Although the construction of the enclosure 30 is generally the same in the embodiments herein described, the details of the housing sections 34 and cover plates 36 vary as described more fully below depending on the design of the bearing cooling system used.

Referring to FIG. 3, the flywheel assembly 40 comprises a flywheel 42 and flywheel shaft 44 that is mounted for rotation inside the enclosure 30 of the gimbal 20 so that the axis of rotation F of the flywheel assembly 40 is perpendicular to the gimbal axis G. Thus, when the boat 5 is level such that gimbal axis G is horizontal, the axis of rotation F of the flywheel shaft 44 will be in the vertical direction, typically perpendicular to the deck of the boat. The flywheel 42 and shaft 44 may be formed as a unitary piece, or may comprise two separate components. In one exemplary embodiment, the diameter and the flywheel 42 is approximately 20.5 inches and the flywheel assembly 40 has a total weight of about 614 lbs. The flywheel assembly 40 has a moment of inertia of about 32,273 lbm in$^2$. When rotated at a rate of 9000 rpm, the angular momentum of the flywheel assembly 40 is about 211,225 lbm ft$^2$/s.

The flywheel assembly 40 is supported by upper and lower bearing assemblies inside the enclosure 30. Each bearing assembly comprises a bearing 50 mounted within a bearing block 58. Each bearing 50 comprises an inner race 52 that is affixed to and rotates with the flywheel shaft 44, an outer race 54 that is mounted inside the bearing block 58, and one or more ball bearings 56 disposed between the inner and outer races 52, 54. The bearing blocks 58 are secured to the interior of the enclosure 30. The outer race 54 is mounted to bearing block 58, and bearing block 58 is mounted to the enclosure 30, so that the outer race 54 is rotationally fixed relative to the enclosure 30. The mounting of the bearing block 58 to the enclosure 30 may be via any suitable means, such as by suitable lip(s) in the bearing block 58 and one or more bearing cap plates 59a held by screws. Likewise, the affixing of the inner race 52 to the flywheel shaft 44 may be by any suitable means, such as press fitting, and/or suitable lip(s) in the flywheel shaft 44 and one or more bearing cap plates 59b held by screws. The bearing block 58 may be generally round in cross-section (perpendicular to flywheel axis F), but this is not required and any suitable shape may be employed, including faceted shapes. Seals (not shown) are disposed on the top and bottom of the bearings 50 to contain lubricant in the bearings 50.

The motor 60 rotates the flywheel assembly 40 at a high rate of speed (e.g., 9000 rpm). The motor 60 typically includes a rotor 62 that mounted to the flywheel shaft 44 and a stator 64 that this secured to the enclosure 30 by any suitable mounting system. Although the motor 60 is advantageously mounted inside the enclosure 30, it is also possible to mount the motor 60 on the exterior of the enclosure 30. In one embodiment, the motor 60 operates on 230 Volt single phase AC power (or could be three-phase AC power, or AC or DC battery power, such as from a lithium ion battery pack).

Figure 4:
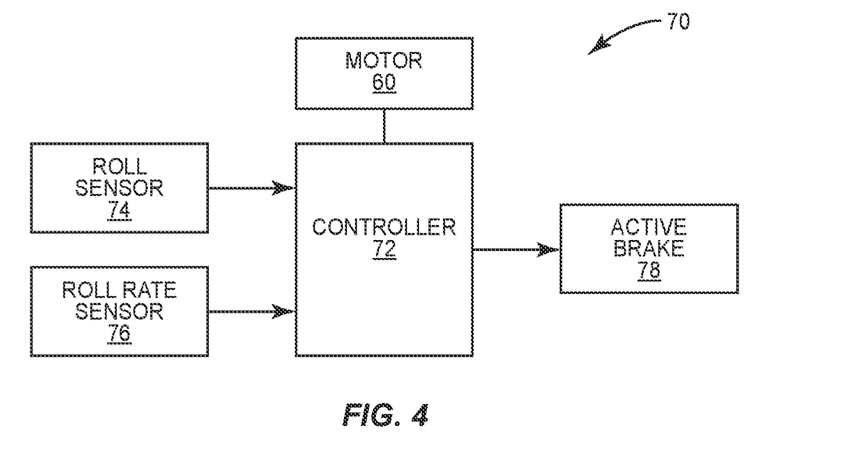
FIG. 4 shows a torque control system for the CMG.

The torque control system 70, shown in FIG. 4, controls the rate of precession of the flywheel assembly 40 about the gimbal axis G. The rolling motion of a boat 5 caused by wave action can be characterized by a roll angle and roll rate. The rolling motion causes the flywheel 42 to precess about the gimbal axis G. Sensors 74, 76 measure the roll angle and roll rate respectively, which are fed to a controller 72. The controller 72 generates control signals to control an active braking system or other torque applying device 78 that controls the rate of precession of the flywheel assembly 40. By controlling the rate of precession, the flywheel assembly 40 generates a torque in opposition to the rolling motion. This torque is transferred through the gimbal 20 to the boat 5 to dampen the roll of the boat 5. An example of the active braking system 78 is described in U.S. Patent Application Publication 2020/0317308, entitled "Braking System For Gyroscopic Boat Roll Stabilizer", the disclosure of which is incorporated herein by reference in its entirety.

When the flywheel assembly 40 rotates at high speed, the bearings 50 and motor 60 will generate a substantial amount of heat, particularly when the flywheel assembly 40 is precessing, which could lead to bearing and/or motor failure. Cooling the bearings is challenging, particularly when the interior of the enclosure 30 is a significantly below ambient pressure environment. Bearing cooling system 100 allows cooling of bearings 50 and other heat generating components contained within the enclosure without direct contact of the recirculated oil or liquid coolant with the bearings 50, which may result in high frictional losses. In general, heat is transferred by solid and/or liquid conduction to a heat sink that is cooled by oil, glycol, or other liquid coolant flowing along the cooling circuit 100.

Note that the flywheel shaft 44 has a first end and an opposite second end. For ease of reference, these may be referred to as the north end 47N and the south end 47S, it being understood that such labels are merely for convenience, and the orientations may be reversed as desired. The north end 47N of the flywheel shaft 44 includes an open-ended cavity 46N, which faces away from the flywheel 42. Likewise, the south end 47S of the flywheel shaft 44 includes an open-ended cavity 46S, which faces away from the flywheel 42. These cavities 46N,46S are involved with cooling the bearings 50, and may generically be referred to as cavity 46. Note that the cavities 46 are open-end in that they are open-ended with respect to the rest of the flywheel shaft 44, even if the cavities 46 are closed off by other components, such as seal 125 and/or cover plates 36. In the discussion below, cooling of bearings 50 associated with the north end 47N will be discussed; it being understood that cooling of bearings 50 associated with the south end 47S is advantageously performed similarly, and discussion of the cooling of the bearings 50 associated with the south end 47S is generally omitted for clarity.

Bearing cooling circuit 100 is configured to transfer heat away from the inner race 52 of the bearing 50 by recirculating cooling fluid 90. See FIG. 7. The cooling fluid 90 in bearing cooling circuit 100 may be any suitable fluid, with a liquid such as glycol and/or glycol mixtures being particular examples.

Figure 5:
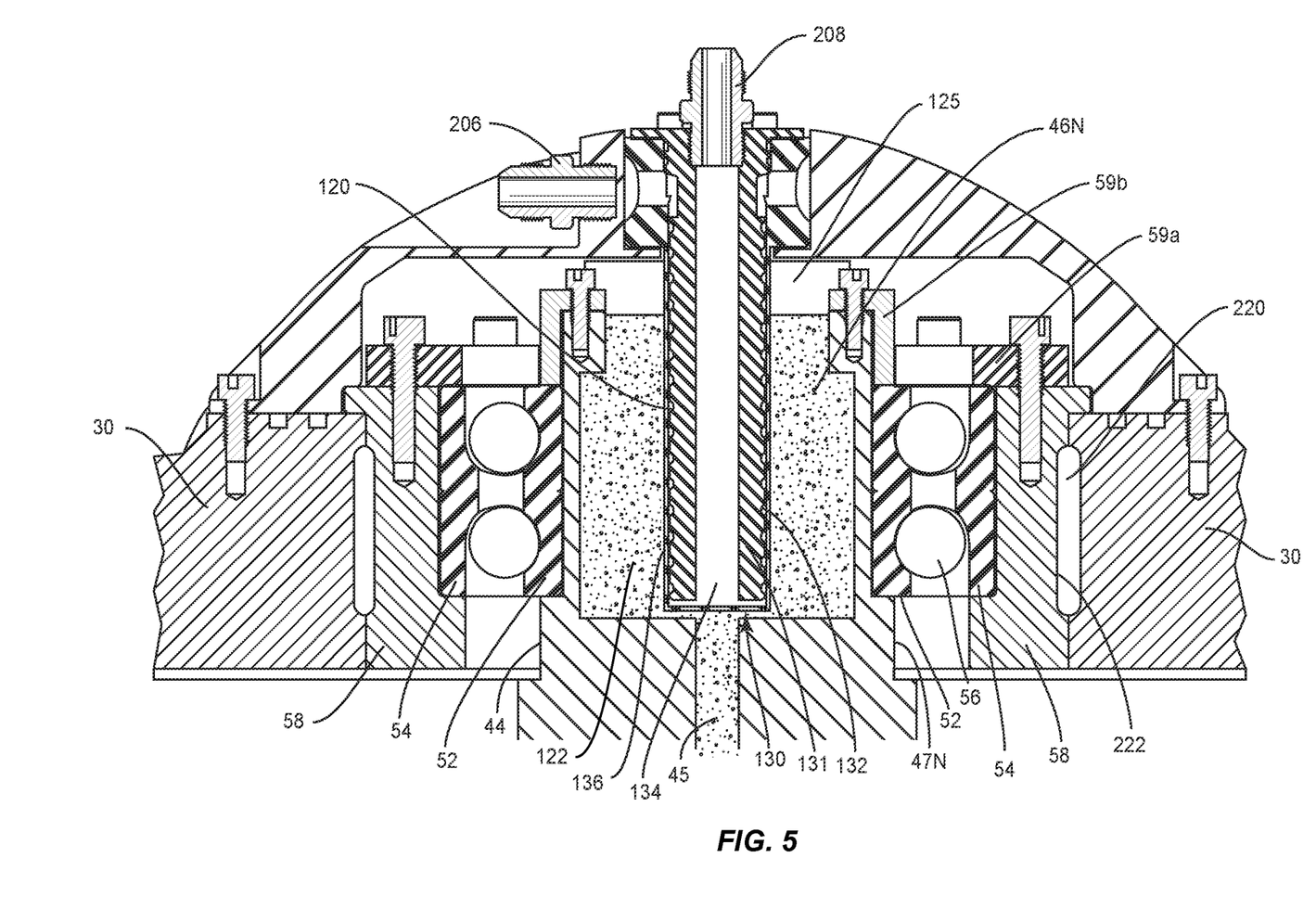
FIG. 5 shows a partial section view illustrating portions of the bearing cooling system according to an embodiment.

FIG. 5 illustrates a bearing cooling circuit 100 for a gyroscopic boat stabilizer (e.g., CMG 10) for cooling the inner race 52 of bearing 50. As mentioned above, the flywheel shaft 44 includes open-ended cavity 46 formed in each end of the flywheel shaft 44. A liquid heat transfer medium 122 is disposed in cavity 46. The liquid heat transfer medium 122 may be any suitable material for operating in the low-pressure environment of the enclosure 30. For example, the liquid heat transfer medium 122 may be hydrocarbon oils (alkylated aromatics as well as alkanes, paraffinic mineral oils, and other synthetic hydrocarbons), fluorocarbon oils (such as PFPE), silicone fluids of various chain lengths (e.g., polydimethylsiloxane (PDMS)), glycol mixtures, and combinations thereof. The liquid heat transfer medium 122 is held in cavity 46 by one or more suitable seals 125. Note that the inner race 52 is affixed to the flywheel shaft 44 proximate cavity 46.

As shown in FIG. 5, bearing cooling circuit 100 includes a heat transfer shaft assembly 130 rotationally fixed relative to the flywheel axis F and extending from the enclosure 30 into cavity 46 so as to contact liquid heat transfer medium 122. The bearing cooling circuit 100 also includes a closed fluid pathway 210 for the cooling fluid 90 that extends through the heat transfer shaft assembly 130 to internally cool the heat transfer shaft assembly 130. The CMG 10 is configured to transfer heat away from the inner race 52 to the flywheel shaft 44, and from the flywheel shaft 44 to the liquid heat transfer medium 122, and from the liquid heat transfer medium 122 to the heat transfer shaft assembly 130, and from the heat transfer shaft assembly 130 to the cooling fluid 90. Note that the cavity 46 is wider (in the horizontal direction of FIG. 5) than the corresponding section of the heat transfer shaft assembly 130. Thus, the heat transfer assembly 130 and the inner wall of the cavity 46, assuming both are round in cross-section, are annularly spaced from one another by a gap, and the liquid heat transfer medium 122 is disposed in this gap. Optimal sizing of this gap may depend on the viscosity, heat transfer, and other characteristics of the heat transfer medium 122, which impact the viscous drag and/or corresponding heat generation of the heat transfer medium 122. In some aspects, this gap advantageously in the range of about one half to one and a half inches.

In some aspects, the heat transfer shaft assembly 130 is a simple unified shaft that includes an internal chamber for the cooling fluid to be circulated through. In other aspects, the heat transfer shaft assembly 130 includes a shaft 131, a sleeve 136, and fluid channel 120. The shaft 131 extends from the enclosure 30 and into cavity 46. The shaft 131 advantageously has outer groove(s) 132 and an inner passage 134. Groove(s) 132 may be oriented perpendicular to the flywheel axis F, or may advantageously spiral around the flywheel axis F, such as by being helical or other spiral shape. Alternatively, groove(s) 132 may wind around the shaft 131 in any suitable fashion, such as in a sinusoidal shape, or a zig-zag shape, whether regular or irregular. Advantageously, the fluid pathway 210 peripherally surrounds the flywheel axis F, such as by circumnavigating the shaft 131. The sleeve 136 is disposed about the shaft 131 in spaced relation to the "floor" of the groove(s) 132 and in spaced relation to an inner wall on flywheel shaft 44 defining the cavity 46. A fluid channel 120 is jointly defined by the sleeve 136 and the groove(s) 132, with the fluid channel 120 having the cooling fluid therein. A closed fluid pathway 210 for recirculating cooling fluid 90 extends through fluid channel 120. Note that in alternative embodiments, the groove(s) 132 are alternatively and/or additionally formed on the sleeve 136. Thus, it should be considered that the fluid channel 120 is jointly formed by the shaft 131 and sleeve 136, regardless of whether the groove(s) 132 are in the shaft 131, or the sleeve 136, or both.

Cooling fluid 90 flows through the bearing cooling circuit 100, including the fluid channel 120. When shaft 131 with inner passage 134 is present, the inner passage 134 may be downstream relative to the fluid channel 120 along the fluid pathway 210, so that cooling fluid 90 flows through the fluid channel 120, and then out of the heat transfer shaft assembly 130 via the inner passage 134. In other aspects, the flow is reversed so that cooling fluid 90 flows through the inner passage 134, and then out of the heat transfer shaft assembly 130 via the fluid channel 120.

Figure 7:
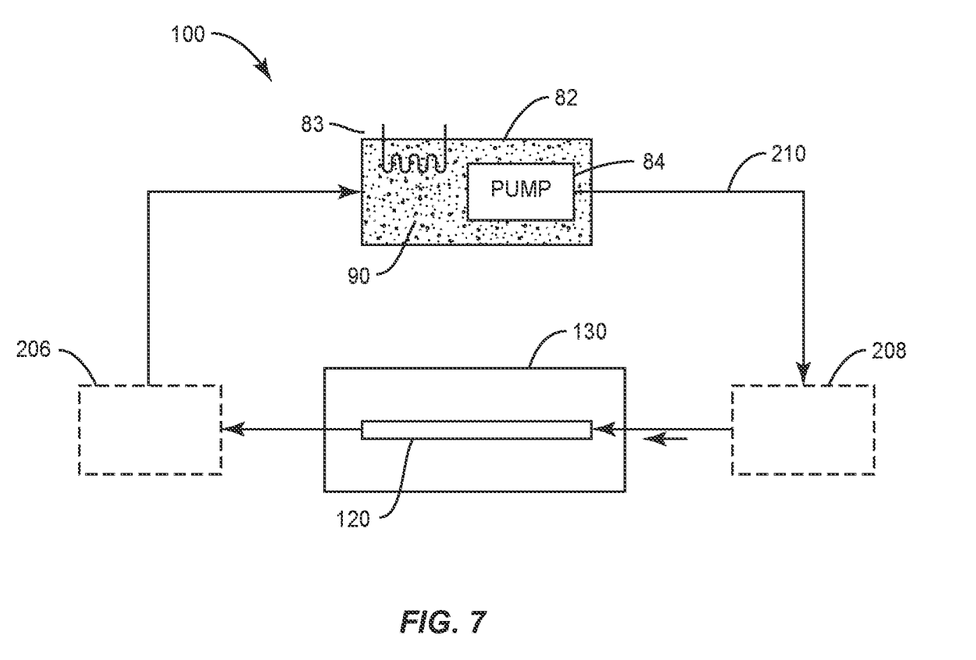
FIG. 7 shows a simplified schematic of a bearing cooling circuit for cooling the inner race.

As shown schematically in FIG. 7, bearing cooling circuit 100 includes a reservoir 82 for the cooling fluid 90 flowing through the "closed" circuit of cooling circuit 100, and a fluid pump 84 operative to recirculate the cooling fluid 90 through bearing cooling circuit 100, and a heat exchanger 83. The pump 84 is operatively connected to the fluid channel 120 and configured to recirculate the cooling fluid 90 through the fluid channel 120 to remove heat from the inner race 52 via the flywheel shaft 44, the liquid heat transfer medium 122, and heat transfer shaft assembly 130. The heat exchanger 83 is operatively connected to the closed fluid pathway 210 and configured to remove heat from the cooling fluid 90 to ambient after the cooling fluid 90 has passed through fluid channel 120. In some embodiments, a scavenging means is provided to collect liquid coolant that may seep into the interior of the enclosure 30 and return the liquid coolant to the fluid reservoir 82. Also, in some aspects, the fluid pathway 210 also includes an inlet port 206 and an outlet port 208. The inlet port 206 is operatively disposed between the pump 84 and the fluid channel 120, and operative to allow passage of the cooling fluid 90 into the enclosure 30 toward the fluid channel 120. The outlet port 208 is operatively disposed between the fluid channel 120 and the heat exchanger 83, and operative to allow passage of the cooling fluid 90 out of the enclosure 30 toward the heat exchanger 83.

For the FIG. 5 arrangement, the heat flow for dissipating heat from the inner race 52 is from the inner race 52, to the flywheel shaft 44, then to the liquid heat transfer medium 122, then to the heat transfer shaft assembly 130, then to the cooling fluid 90, typically then to external to the CMG 10 via the heat exchanger 83.

Figure 6:
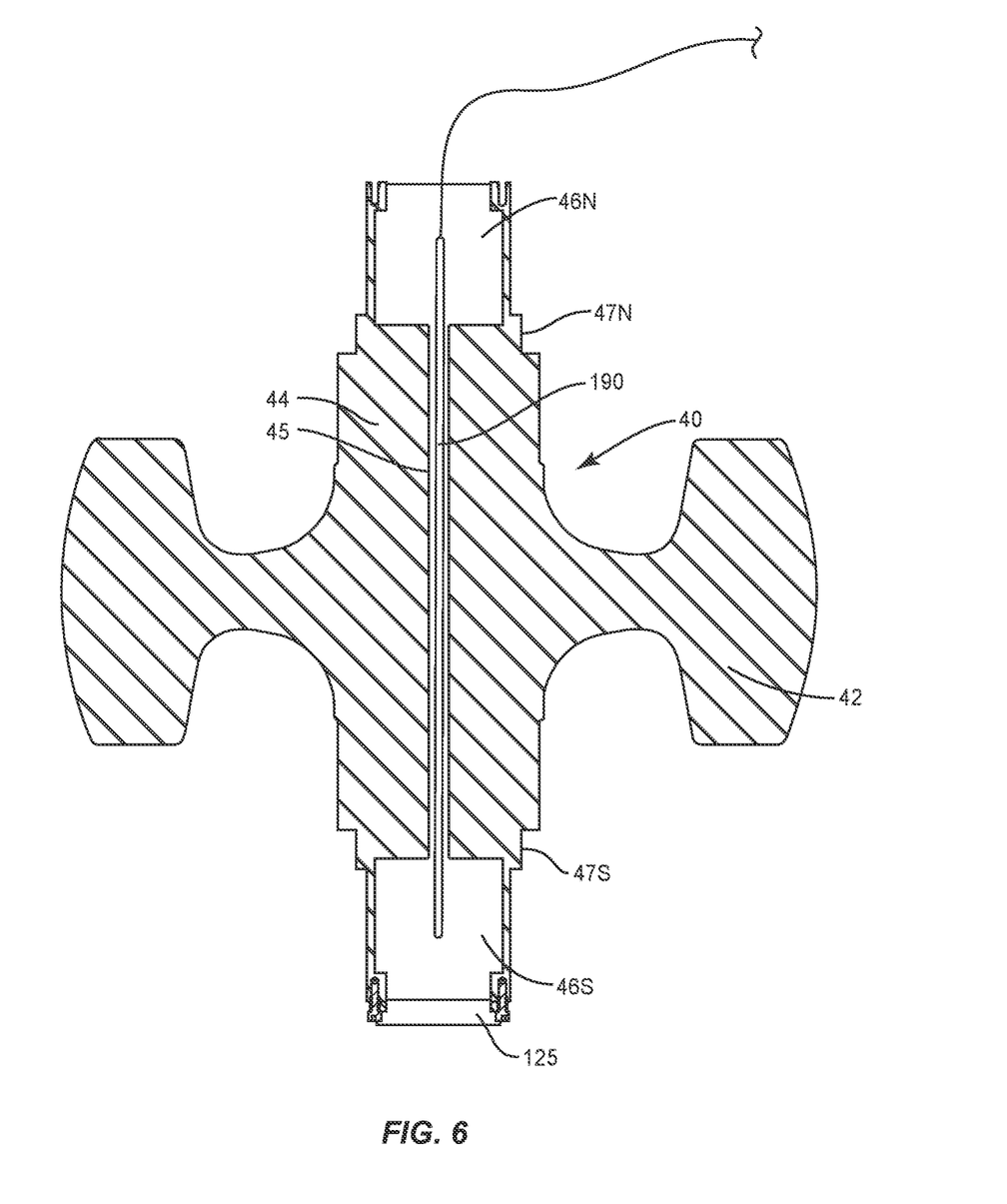
FIG. 6 shows a section view of a flywheel assembly with a longitudinal passage through the flywheel shaft, an associated seal, and an inspection tool.

As can be appreciated, keeping liquid heat transfer medium 122 in cavity 46 allows proper cooling of bearing 50. As such, seals, such as seal 125 in FIG. 5, are disposed to keep the heat transfer medium 122 in cavity 46. However, verifying the condition of cavity 46 and/or a good seal prior to operation may help improve performance. To this end, the flywheel shaft 44 includes a longitudinal passage 45 that operatively interconnects the upper and lower cavities 46. Referring to FIGS. 5-6, the flywheel shaft 44 has two ends 47, which may be referred to as the north end 47N, and the opposing south end 47S. The north end 47N includes the north cavity 46N, while the south end 47S includes the south cavity 46S. The ends 47N, 47S may be generically referred to as end 47, while the cavities 46N, 46S may be generically referred to as cavity 46. Longitudinal passage 45 connects the cavities 46N, 46S. Longitudinal passage 45 may be formed during forging of the flywheel shaft 44, by gun drilling the flywheel shaft 44, or by other means. The longitudinal passage 45 opens into each cavity 46, and allows for the heat transfer medium 122 in the two cavities 46 to be in fluid communication. In addition, the longitudinal passage 45 allows for one cavity (e.g., 46S) to be inspected and/or filled from the opposing end (e.g., north end 47N) of the flywheel shaft 44. Thus, the south cavity 46S may be inspected and/or (wholly or partly) filled with heat transfer medium 122 from the north end 47N of flywheel shaft 44, and/or the north cavity 46N may be inspected and/or (wholly or partly) filled with heat transfer medium 122 from the south end 47S of flywheel shaft 44.

Figure 8:
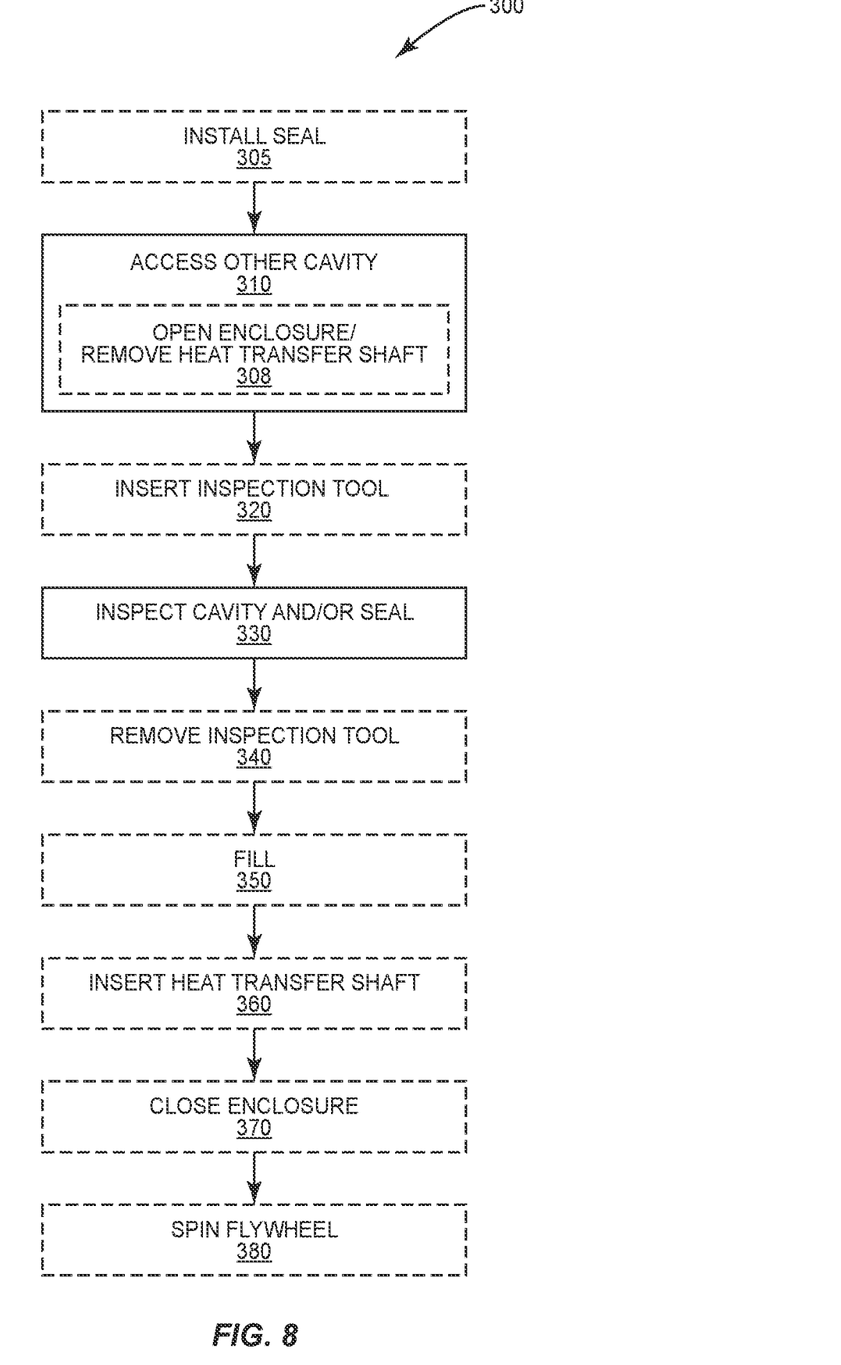
FIG. 8 shows a simplified flowchart of an exemplary method for assembling or maintaining a gyroscopic roll stabilizer.

An exemplary process (300) of assembling or maintaining the gyroscopic roll stabilizer 10 is shown in FIG. 8. The process optionally starts with installing (305) the seal 125 associated with the second cavity 46, which is the south cavity 46S in this example. Note that if the gyroscopic roll stabilizer 10 is already assembled, step 305 is typically not necessary unless that seal 125 is known to be in need of replacement. The process includes accessing (310) the other cavity 46, which is the north cavity 46N in this example. The accessing (310) may include opening (308) the enclosure 30 and removing the heat transfer shaft assembly 130 from the north cavity 46N. Note that step 308 is useful for maintaining (preventive maintenance or service maintenance) the CMG 10, but is likely not required for initial assembly of the CMG 10 unless some sort of initial assembly rework is required. The liquid heat transfer medium 122, if present, is then optionally removed from the CMG 10 via any suitable method. The process includes inspecting (330) the south cavity 46S and/or the seal 125 associated with the south cavity 46S via the longitudinal passage 45, wherein the longitudinal passage 45 is accessed via the north cavity 46N for the inspecting. The inspection may be by pressure test, a leak down test, and/or via an inserted inspection tool 190, such as a bore scope. When using an inserted inspection tool 190, the process optionally includes inserting (320) the inspection tool 190 into the longitudinal passage 45 in a direction toward the south end 47S, and advantageously into the south cavity 46S. Note that some inspections may not require an inspection tool 190 to be inserted into the longitudinal passage 45, such as a gas pressure test where the gas pressure is applied in north cavity 46N with suitable sealing, such that longitudinal passage 45 allows that pressure to be communicated between the cavities 46. If used, the inspection tool 190 is advantageously then removed (340) once the inspection is complete. Note that the seal 125 associated with the south cavity 46S may be adjusted or replaced based on the inspection, during or after the inspecting (330). The exemplary process optionally continues with filling (350) the second cavity (e.g., south cavity 46S) with a liquid heat transfer medium 122 via the longitudinal passage 45. This filling (350) advantageously optionally includes filling the longitudinal passage 45, and at least part of the first cavity (e.g., north cavity 46N), with the liquid heat transfer medium 122. The process optionally includes thereafter inserting (360) the heat transfer shaft assembly 130 back into the first cavity (e.g., north cavity 47N). Further, the process optionally includes closing (370) the enclosure 30 and/or thereafter spinning (380) the flywheel 42.

The exemplary process (300) discussion above has been in the context of the south cavity 46S and/or the seal associated with the south cavity 46S being inspected via the longitudinal passage 45. Such an approach may be particularly useful when assembling the gyroscopic roll stabilizer 10, starting with assembly of the southern portions. With the enclosure 30 inverted, such that the south cavity 46S is disposed above the north cavity 46N, the southern heat transfer shaft assembly 130 may be inserted into the south cavity 46S, the associated seal 125 installed, and the south cover plate 36 installed. At this point, the south cavity 46S does not have heat transfer medium 122 therein. The enclosure 30 is then "righted" so that the north cavity 46N and the north end 47N of the flywheel shaft 44 is disposed above the south cavity 46S and the south end 47S of the flywheel shaft 44. The process of inspecting (330) the south cavity 46S and/or seal 125, and filling (350), is then carried out. The north cavity 46N is then fully filled with heat transfer medium 122 as appropriate, and the north seal 125 installed. The north cover plate 36 is then installed. The CMG 10 is then optionally tested, such as by spinning (380) the flywheel, as appropriate.

The presence of the longitudinal passage 45 connecting the cavities 46 provides benefits which may be present all together, or separately, depending on the particular embodiment of the gyroscopic roll stabilizer. First, the longitudinal passage 45 allows the south cavity 46S and/or seal 125 to be inspected both after the southern portion is closed up with the seal 125 in place, and from the opposing (north) end 47N of the enclosure 30. Second, the longitudinal passage 45 allows heat transfer medium 122 to be added to south cavity 46S both after the southern portion is closed up with the seal 125 in place, and from the opposing (north) end 47N of the enclosure. The heat transfer medium 122 flows down into the south cavity 46S along the longitudinal passage 45, and any displaced air/gas can escape through the longitudinal passage 45. Thus, gravity can assist in filling the south cavity 46S with the enclosure 30 inverted. The ability to inspect and/or fill one cavity 46 from the opposing end 47 may be particularly beneficial during assembly, or during maintenance (servicing), when access to one end 47 or the other of the enclosure 30 may be restricted. A further benefit is that fluid pressure of the heat transfer medium 122 may be equalized between the north cavity 46N and the south cavity 46S, because the two cavities 46 are in fluid communication via the longitudinal passage 45, which may be beneficial for some situations.

It should be understood that the roles and positions of the north and south cavities 46 (and north and south ends 47) may be reversed, as is desired.

The discussion above has been in the context that the approach to cooling the bearings 50 includes a bearing cooling circuit 100 having a heat transfer shaft assembly 130. However, additional and/or alternative approaches to cooling the bearings 50 may be employed. For example, the outer race 54 may be cooled via a suitable fluid channel 220 in bearing block 58, which may be formed in part by one or more grooves 222 on the bearing block 58, and which may optionally for an additions portion of bearing cooling circuit 100. And, other known approaches to cooling the bearings 50 may be employed, such as those disclosed in U.S. Patent Application Publication 2009/0367137, the disclosure of which is incorporated herein by reference in its entirety.

The longitudinal passage 45 may, in some embodiments, be the only passage through the flywheel shaft 44 that connects the cavities 46. However, in some embodiments, there may be multiple longitudinal passages 45 that connect the cavities 46. If there are multiple passages 45, care should be taken in locating them so that the flywheel assembly 40 is properly balanced, such by locating the various passages symmetrically about the flywheel axis F.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A gyroscopic roll stabilizer for a boat, the gyroscopic roll stabilizer comprising:
   an enclosure mounted to a gimbal for rotation about a gimbal axis and configured to maintain a below-ambient pressure;
   a flywheel assembly rotatably mounted inside the enclosure for rotation about a flywheel axis; the flywheel assembly including a flywheel and flywheel shaft; the flywheel shaft having:
   a first end and an opposite second end;
   a first open-ended cavity formed in the first end and facing away from the second end; and
   a second open-ended cavity formed in the second end and facing away from the first end; and
   a motor operative to rotate the flywheel assembly;
   wherein the flywheel shaft has a longitudinal passage connecting the first cavity and the second cavity;
   a liquid heat transfer medium disposed in the longitudinal passage, the second cavity, and the first cavity; wherein the liquid heat transfer medium is held in the flywheel shaft so as to not recirculate through the longitudinal passage from external to the enclosure.

2. The gyroscopic roll stabilizer of claim 1, further comprising a first heat transfer shaft assembly rotationally fixed relative to the flywheel axis and extending from the enclosure into the first cavity so as to contact the liquid heat transfer medium.

3. The gyroscopic roll stabilizer of claim 1, wherein the first end is disposed above the second end.

4. The gyroscopic roll stabilizer of claim 3, wherein the heat transfer medium fills the second cavity and the longitudinal passage; wherein the heat transfer medium does not fill the first cavity at room temperature.

5. A method of assembling or maintaining a gyroscopic roll stabilizer for a boat; wherein the gyroscopic roll stabilizer comprises an enclosure and a flywheel assembly supported in the enclosure for rotation about a flywheel axis; the flywheel assembly including a flywheel shaft and a flywheel; the method comprising:
   accessing a first open-ended cavity in a first end of the flywheel shaft;
   inspecting a second open-ended cavity in a second end of the flywheel shaft and/or a seal associated with the second cavity via a longitudinal passage in the flywheel shaft that extends between the first cavity and the second cavity; wherein the longitudinal passage is accessed via the first cavity for the inspecting.

6. The method of claim 5, wherein the inspecting comprises inspecting the seal associated with the second cavity.

7. The method of claim 5, wherein the inspecting comprises executing a pressure test.

8. The method of claim 5, further comprising:
   inserting an inspection tool into the longitudinal passage toward the second end; and
   removing the inspection tool.

9. The method of claim 8, further comprising, prior to the inserting, removing, from the first cavity, a first heat transfer shaft assembly rotationally fixed relative to the flywheel axis and extending from the enclosure.

10. The method of claim 5, further comprising thereafter filling the second cavity with a liquid heat transfer medium via the longitudinal passage.

11. The method of claim 10, further comprising filling the longitudinal passage, and at least part of the first cavity, with the liquid heat transfer medium.

12. The method of claim 10, further comprising after the filling, inserting a first heat transfer shaft assembly rotationally fixed relative to the flywheel axis and extending from the enclosure into the first cavity.

13. The method of claim 5, further comprising adjusting or replacing the seal based on the inspecting.

14. A method of assembling a gyroscopic roll stabilizer for a boat; wherein the gyroscopic roll stabilizer comprises an enclosure and a flywheel assembly supported in the enclosure for rotation about a flywheel axis; the flywheel assembly including a flywheel shaft and a flywheel; the method comprising:
   installing a second seal associated with a second open-ended cavity in a second end of the flywheel shaft;
   accessing a first open-ended cavity in an opposing first end of the flywheel shaft;
   inspecting, with the second seal installed, the second open-ended cavity and/or the second seal via a longitudinal passage in the flywheel shaft that extends between the second cavity and the first cavity;
   filling the second cavity with a liquid heat transfer medium via the longitudinal passage by adding the liquid heat transfer medium to the longitudinal passage and/or the first cavity;
   after the filling, closing the enclosure;
   wherein the longitudinal passage is accessed via the first cavity for the inspecting.

15. The method of claim 14, wherein the inspecting comprises inspecting the second seal.

16. The method of claim 14, wherein the inspecting comprises executing a pressure test.

17. The method of claim 14, further comprising:
   inserting an inspection tool into the longitudinal passage toward the second end; and
   removing the inspection tool.

18. The method of claim 14, wherein the filing comprises filling the longitudinal passage, and at least part of the first cavity, with the liquid heat transfer medium.

19. The method of claim 14, further comprising after the filling and before the closing, inserting a first heat transfer shaft assembly rotationally fixed relative to the flywheel axis and extending from the enclosure into the first cavity.

20. The method of claim 14, further comprising adjusting or replacing the second seal based on the inspecting.

* * * * *